United States Patent
van Thiel

(10) Patent No.: US 12,330,604 B2
(45) Date of Patent: Jun. 17, 2025

(54) OPERATIONALLY RELIABLE PARKING BRAKE VALVE ASSEMBLY HAVING MULTIWAY SWITCHING IN SERIES

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/778,553

(22) Filed: Jul. 19, 2024

(65) Prior Publication Data

US 2024/0375628 A1    Nov. 14, 2024

Related U.S. Application Data

(63) Continuation of application No. PCT/EP2023/050268, filed on Jan. 9, 2023.

(30) Foreign Application Priority Data

Jan. 19, 2022    (DE) ...................... 10 2022 101 142.9

(51) Int. Cl.
*B60T 13/68*    (2006.01)
*B60T 13/38*    (2006.01)

(52) U.S. Cl.
CPC .......... *B60T 13/683* (2013.01); *B60T 13/385* (2013.01); *B60T 2270/402* (2013.01)

(58) Field of Classification Search
CPC .................. B60T 13/683; B60T 13/385; B60T 2270/402; B60T 13/66; B60T 13/662; B60T 13/68

See application file for complete search history.

(56) References Cited

U.S. PATENT DOCUMENTS 10,946,848 B2 * 3/2021 Van Thiel ............. B60T 13/683
2005/0029859 A1    2/2005 Bensch et al.
(Continued)

FOREIGN PATENT DOCUMENTS

DE           103 36 611 A1    3/2005
DE    10 2015 008 377 A1    12/2016
(Continued)

OTHER PUBLICATIONS

International Search Report of the European Patent Office dated May 2, 2023 for international application PCT/EP2023/050268 on which this application is based.
(Continued)

*Primary Examiner* — Pamela Rodriguez
(74) *Attorney, Agent, or Firm* — Walter Ottesen, P.A.

(57) ABSTRACT

A parking brake valve assembly for a pneumatic braking system of a vehicle includes a first parking brake valve unit and a second parking brake valve unit. The first parking brake valve unit is actuated by a first parking brake signal and is switchable from a first to a second switching position, and the second parking brake valve unit is actuated by a second parking brake signal and is switchable from a first to a second switching position. The first and second parking brake signal are mutually independent. The first and second parking brake valve unit are pneumatically connected in series between a parking brake supply connection and a parking brake working connection such that the parking brake working connection can be both ventilated and vented independently of the switching position of one of the parking brake valve assemblies by switching the other parking brake valve assembly.

23 Claims, 9 Drawing Sheets

(56) References Cited

U.S. PATENT DOCUMENTS

| | | | |
|---|---|---|---|
| 2019/0248349 A1* | 8/2019 | Wulf | B60W 10/184 |
| 2022/0289159 A1* | 9/2022 | Van Thiel | B60T 8/94 |
| 2022/0297655 A1* | 9/2022 | Dieckmann | B60T 13/683 |

FOREIGN PATENT DOCUMENTS

| | | |
|---|---|---|
| DE | 10 2017 005 757 A1 | 12/2018 |
| DE | 10 2019 131 930 A1 | 5/2021 |
| DE | 10 2019 133 011 A1 | 6/2021 |

OTHER PUBLICATIONS

English translation and Written Opinion of the International Searching Authority dated May 2, 2023 for international application PCT/EP2023/050268 on which this application is based.

* cited by examiner

OPERATIONALLY RELIABLE PARKING BRAKE VALVE ASSEMBLY HAVING MULTIWAY SWITCHING IN SERIES

CROSS-REFERENCE TO RELATED APPLICATIONS

This application is a continuation application of international patent application PCT/EP2023/050268, filed Jan. 9, 2023 designating the United States and claiming priority from German application 10 2022 101 142.9, filed Jan. 19, 2022, and the entire content of both applications is incorporated herein by reference.

TECHNICAL FIELD

The disclosure relates to a parking brake valve assembly for a pneumatic braking system of a utility vehicle, with at least one first parking brake valve unit and at least one second parking brake valve unit, wherein the first parking brake valve unit is actuated by a first parking brake signal and can be switched from a first switching position to a second switching position, and the second parking brake valve unit is actuated by a second parking brake signal and can be switched from a first switching position to a second switching position. The disclosure also relates to a parking brake module for a pneumatic braking system of a utility vehicle, with a parking brake supply connection for receiving supply pressure, a spring-loaded connection for providing parking brake pressure, and a parking brake valve assembly mentioned above. Furthermore, the disclosure relates to a utility vehicle and a trailer.

BACKGROUND

With electropneumatic braking systems for modern vehicles, safety concepts are of great relevance. Particularly in the case of vehicles with automated or partially automated driving functions, concepts for triggering default braking in the event of a fault or power failure of a control unit make a significant contribution to the safety of the vehicle, the occupants and other road users. Such concepts make it possible to stop the vehicle safely in the event of a fault or power failure.

Basically, there are concepts that implement failure braking via a service brake system and those that implement this via a parking brake system. Braking systems often implement both concepts in order to realize two or more fallback levels, which are then based on the different concepts. The basic advantage of concepts based on a parking brake system is that a safe stop of the vehicle can be achieved by venting a preloaded spring-loaded brake cylinder without the need to pressurize a brake actuator with compressed air.

For example, DE 10 2019 131 930 A1 already describes an electropneumatic parking brake module for an electronically controllable pneumatic braking system for a vehicle with a supply connection for receiving a supply pressure, at least one parking brake connection for connecting at least one parking brake cylinder, a main valve unit receiving the supply pressure, which is configured to apply a spring-loaded pressure to the parking brake connection depending on a control pressure, and a pilot control valve assembly receiving the supply pressure for providing the control pressure, wherein the pilot control valve assembly has a bistable valve that can be switched between a first ventilation position and a second vent position, and a control unit for providing first and second switching signals to the pilot control valve assembly.

In the case of the electropneumatic parking brake module shown in DE 10 2019 131 930 A1, the pilot control valve assembly has a monostable holding valve pneumatically connected in series with the bistable valve and arranged in a control line of the main valve unit, wherein the holding valve is normally open, and the control unit is configured to hold the holding valve in the holding position via the first switching signal to maintain the control pressure, and a selector valve unit is arranged in the control line between the holding valve and a control connection of the main valve unit, with a first selector valve connection for receiving an auxiliary control pressure provided at an auxiliary brake pressure connection, wherein the selector valve unit has a non-return characteristic at the first selector valve connection such that the first selector valve connection is open in a flow direction from the auxiliary brake pressure connection via a third selector valve connection to the control connection and blocks against the flow direction.

A solution for ventilating spring-loaded brake cylinders is disclosed in DE 10 2017 005 757 A1. The solution disclosed there uses a pilot control valve unit as well as a main valve unit, wherein the pilot control valve unit contains an electromagnetic solenoid valve in the form of a bistable valve. The main valve unit is formed by a relay valve in the solution disclosed there. Depending on the switching position of the electromagnetic bistable valve, a control pressure is exerted at the main valve unit, which then controls a volume pressure for the spring-loaded brake cylinders in a corresponding manner. A bistable valve is a solenoid valve that has two stable switching positions, in particular a stable ventilation position and a stable venting position. For this purpose, an armature of the solenoid valve can be moved to a first position by energizing a first electromagnet so that the solenoid valve takes up the ventilation position, and by energizing a second electromagnet the armature of the solenoid valve can be moved to a second position so that the solenoid valve takes up the venting position. If no other force acts on the armature, or if it can be mechanically and/or magnetically locked in the positions, the respective switching position is stable, as it can be maintained without further energization.

A braking system with another parking brake device of the same type is disclosed in US 2005/0029859. It discloses a pressure medium-operated braking system for a vehicle with a parking brake function with which, as a result of the manual actuation of an electric parking brake signaling device, at least one wheel brake of the brake system can be operated without the use of a brake pedal via an actuator that can be actuated with the pressure medium. Based on this, a pressure-medium operated braking system for a vehicle is specified, with which a parking brake function that can be operated via an electric signaling device can be integrated with little effort in compliance with the relevant safety regulations for braking systems. This is achieved by providing a parking brake module in which an electronic control device and a valve device electrically operated by the electronic control device are integrated, wherein the electronic control device activates the holding brake function on receiving an electrical actuation signal from the parking brake signal requesting the activation of the parking brake function, wherein the electronic control device controls the pressurization of the actuator via the electrically actuated valve device within the parking brake function.

Furthermore, such a system is also known, for example, from DE 10 2015 008 377 A1. The system disclosed there contains a parking brake module of a parking brake device, which can be used to control the pressurization of at least one brake actuator. The parking brake module has an electronic control device, at least one solenoid valve operated by the control device, a pressure booster valve for pressurizing at least one brake actuator and at least one pressure medium input through which pressure medium can be supplied to the parking brake module. The parking brake module has an emergency release pressure medium connection and a double non-return valve. The parking brake module has a first pressure medium line with which the emergency release pressure medium connection is fluidically connected to the supply input of the pressure medium boosting valve via a non-return valve in such a way that pressure medium flows through this first pressure line from the emergency release pressure medium connection to the pressure medium boosting valve if the pressure applied to the emergency release pressure medium connection is greater than the pressure at the supply input of the pressure medium boosting valve. The parking brake module has a second pressure medium line with which the emergency release pressure medium connection or another pressure medium connection of the parking brake module is fluidically connected to an input of the double non-return valve in such a way that the pressure medium will flow through this second pressure medium line from the emergency release pressure valve to the double non-return valve if the pressure applied to the emergency release pressure medium connection is greater than the pressure at the input of the double non-return valve. Alternatively the pressure medium flows through this second pressure medium line from the further pressure medium connection to the double non-return valve if the pressure applied to the further pressure medium connection is greater than the pressure applied to the input of the double non-return valve.

SUMMARY

In order to extend the functionality and, in particular, to be able to ventilate and thus release the corresponding spring-loaded cylinders of the parking brake regardless of the occurrence of a fault in one of the different levels, be it the operating level or a redundancy level of the braking system, it is desirable that the spring-loaded brake cylinders can be actuated via two independent paths in order to ventilate and also vent them. This is intended to increase the range of functions and operational readiness of the vehicle in order to be able to maintain the highest possible range of functions even in the event of one or more faults in the braking system.

In a first aspect of the disclosure, the object is achieved by a parking brake valve assembly of the type first mentioned, in which the first parking brake signal and the second parking brake signal are independent of each other, and in which the first parking brake valve unit and the second parking brake valve unit are pneumatically connected in series between a parking brake supply connection and a parking brake working connection in such a way that the parking brake working connection, regardless of the switching position of one parking brake valve unit, can be both ventilated and vented by switching the other parking brake valve unit.

In this way, a parking brake valve assembly is created that can be switched between a ventilation position and a venting position, that is, a release and a clamping position, via two independent signals, namely the first parking brake signal and the second parking brake signal. If, for example, the first parking brake valve unit is controlled so that it is in a first switching position, the second parking brake valve unit can still be switched to the first and second switching positions of the second parking brake valve unit by providing the second parking brake signal, wherein, for example, the parking brake working connection is ventilated in the first switching position of the second parking brake valve unit and the parking brake working connection is vented in the second switching position of the second parking brake valve unit. The same applies to the other case.

For example, a supply pressure of a parking brake circuit can be provided directly to the parking brake supply connection or, if necessary, with the interposition of a change-over valve or a non-return valve. On the other hand, parking brake pressure provided by a parking brake module or parking brake circuit already present in a vehicle can also be provided to the parking brake supply connection. In this case, the parking brake valve assembly can be used to control the pressure provided at the parking brake supply connection to the parking brake working connection or to vent it. The parking brake working connection can preferably be connected to one or more spring-loaded brake cylinders. The spring-loaded brake cylinders can be located in the towing vehicle as well as in a trailer. In this respect, the parking brake valve assembly can also be implemented in a trailer vehicle.

The disclosure makes use of the knowledge that the interconnection of the first and second valve units proposed here makes it possible to ventilate as well as vent the parking brake working connection independently of the switching position of the other parking brake valve assembly. Only one parking brake valve assembly needs to be switched at a time, regardless of the switching position of the other parking brake valve assembly. As a result, regardless of whether, for example, the first or second parking brake valve unit can be switched in a functional manner, the parking brake working connection can be both ventilated and vented, and thus the spring-loaded brake cylinders connected to the parking brake working connection can be released or clamped independently of the functionality of one of the first and second parking brake valve units.

In a first embodiment, the first parking brake valve unit is connected to the parking brake supply connection and receives supply pressure from it. Preferably, the second parking brake valve unit can also be connected to the parking brake working connection and can control a parking brake working pressure at it. As already mentioned above, one or more spring-loaded brake cylinders can then be connected to the parking brake working connection. One or more downstream valves can also be connected to the parking brake working connection, such as a downstream relay valve or the like. A downstream relay valve can be useful if the parking brake working pressure provided by the second parking brake valve unit is first to be increased in volume before it is then provided in volume-boosted form to one or more spring-loaded brake cylinders.

Preferably, the first parking brake signal can be provided by a first signal source and the second parking brake signal is provided by a second signal source, wherein the first signal source and the second signal source are independent of each other. Preferably, the first and second signal sources are supplied from two independent voltage sources. For example, the first signal source is a central module of an electronically controllable pneumatic braking system, while the second signal source is a redundancy module of the electronically controllable pneumatic braking system, wherein the central module and the redundancy module are powered by two independent voltage sources. For example, the redundancy module can be integrated with a parking brake module, a trailer control module or the like. The central module can also be integrated with one or more axle modulators or other modules. It is also conceivable that the first and/or second parking brake signal is provided by a higher-level unit, such as a unit for autonomous driving, an electronic steering unit, an air treatment unit or the like. It may also be possible to provide that one or both of the first and second parking brake signals can be provided manually, for example via switches provided in the cockpit or a manually operated valve.

In an embodiment, the first parking brake valve unit and the second parking brake valve unit are connected to each other via a first valve line and a separate, second valve line for the realization of a changeover switching function. In this way, it is possible for the first and second valve lines to function alternately as a ventilation line and a venting line. For example, if the second parking brake valve unit is in the first switching position, it could be intended that the first valve line acts as the ventilation line and the second valve line as the venting line, and the first parking brake valve unit is switched accordingly. By switching the second parking brake valve unit, it is then possible, for example, to switch between the first and second valve lines in order to connect one of them to the parking brake working connection. In such a case, the first parking brake valve unit may be provided, for example, to reverse the pneumatic ventilation of the first and second valve units. For example, in the first switching position of the first parking brake valve unit, it is provided that the first valve line is ventilated and the second valve line is vented. In the second switching position of the first parking brake valve unit, on the other hand, the first valve line is vented and the second valve line is ventilated.

For example, it is provided that the first valve line or the second valve line can be ventilated with supply pressure and vented via the first parking brake valve unit. For example, in the first switching position of the first parking brake valve unit, the first valve line is ventilated with supply pressure while the second valve line is vented, and in the second switching position of the first parking brake valve unit, the second valve line is ventilated with supply pressure while the second valve line is vented.

Preferably, the second parking brake valve unit can be used to connect either the first valve line or the second valve line to the parking brake working connection.

According to an embodiment, it is provided that the first parking brake valve unit is or has a 4/2-way valve, with a first parking brake valve connection, a second parking brake valve connection, a third parking brake valve connection and a fourth parking brake valve connection. Preferably, in the first switching position, the first parking brake valve connection is connected to the second parking brake valve connection and the third parking brake valve connection is connected to the fourth parking brake valve connection. In the second switching position, the first parking brake valve connection is preferably connected to the fourth parking brake valve connection and the third parking brake valve connection is connected to the second parking brake valve connection. In the first and second switching positions, the connection of the respective connections is changed or cross-connected, so that a part of a changeover switch can be realized by this.

In another embodiment, the first parking brake valve unit has or consists of a first switching valve and a second switching valve. Preferably, both the first and second switching valves are in the form of 3/2-way valves. Both the first and second switching valves are actuated and switched via the first parking brake signal. In this way, they are grouped together as a parking brake valve unit. The first parking brake valve unit and the second parking brake valve unit can also be referred to as the first and second parking brake valves, while then, in the embodiment described, the first and second switching valves can be understood as the first and second valve parts of the first parking brake valve. Since the first and second switching valves are switched together by the first parking brake signal, they can also be combined and referred to as one valve. By interconnecting the first and second switching valves, which are preferably in the form of 3/2-way valves, a functionality can be formed that corresponds to that of the 4/2-way valve described.

According to another embodiment, the second parking brake valve unit is or has a 3/2-way valve. The 3/2-way valve, which forms the second parking brake valve unit, preferably has a fifth parking brake valve connection, a sixth parking brake valve connection, and a seventh parking brake valve connection. In the first switching position, the fifth parking brake valve connection is preferably connected to the sixth parking brake valve connection, and in the second switching position, the seventh parking brake valve connection is connected to the sixth parking brake valve connection. The 3/2-way valve is preferably switched by the second switching position between the two switching positions.

Preferably, in the parking brake valve assembly, it is provided that the first parking brake signal is pneumatic or electric and/or the second parking brake signal is pneumatic or electric. An electrical signal can be provided directly from a higher-level electronic control unit, which in turn generates or receives and transmits the signal. A pneumatic signal can be provided, for example, by electronically switchable solenoid valves, or by one or more manually operated slider valves. This is particularly preferable when the parking brake valve assembly is used in the context of a trailer vehicle.

In an embodiment of the parking brake valve assembly, the first parking brake valve unit and/or the second parking brake valve unit are of bistable form. Preferably, the first parking brake valve unit and/or the second parking brake valve unit is electromagnetically bistable. For example, the first parking brake valve unit and/or the second parking brake valve unit is in the form of a double solenoid valve with two stable magnetic locking poles. On the one hand, this can be achieved by arranging two permanent magnets at opposite ends in such a way that the armature is held in corresponding end positions, or the armature itself is equipped with appropriate magnetic parts in order to be able to be held in the two end positions. This can be achieved by one or two coils. The person skilled in the art is aware of these arrangements and reference is made to the relevant specialist knowledge for further details.

In a second aspect, the disclosure achieves the object mentioned at the beginning via a parking brake module for a pneumatic braking system of a utility vehicle, with a parking brake supply connection for receiving supply pressure, a spring-loaded connection for providing a parking brake pressure, and a parking brake valve assembly according to one of the above embodiments of a parking brake valve assembly according to the first aspect of the disclosure.

While the parking brake valve assembly may be provided to be integrated into a pre-existing system, module or arrangement, the parking brake module according to the second aspect of the disclosure is preferably configured to be used as a stand-alone unit. The parking brake module according to the second aspect of the disclosure may include other functions in addition to the properties and functions described below, such as, in particular, all or some of the known functions of conventional parking brake modules for venting spring-loaded brake cylinders. The parking brake module according to the second aspect of the disclosure can be provided in both a towing vehicle and a trailer vehicle. Preferably, the parking brake working connection is connected to the spring-loaded connection, either directly or with the interposition of one or more valves, such as a relay valve in particular, as will be described in more detail below.

In an embodiment of the parking brake module, this contains a first pilot control unit, which is connected to the parking brake supply connection and receives supply pressure from it, wherein the first pilot control unit is switchable to control a first control pressure, wherein the first control pressure is controlled as the first parking brake signal for switching at least the first parking brake valve. According to this embodiment, the first control pressure therefore forms the first parking brake signal, so that the first parking brake signal in this embodiment is a pneumatic first parking brake signal. The first parking brake valve unit is therefore switched pneumatically according to this embodiment, based on the first control pressure provided by the first pilot control unit.

In an embodiment of the parking brake module, it has a second pilot control unit, wherein the second pilot control unit is connected to the parking brake supply connection and receives supply pressure from it, wherein the second pilot control unit can be switched to control a second control pressure, wherein the second control pressure is controlled as a second parking brake signal for switching at least the second parking brake valve unit. According to this embodiment, the second parking brake signal is also a pneumatic signal and is formed by the second control pressure. The second parking brake valve unit can therefore be switched pneumatically and the second parking brake signal is predetermined pneumatically by the pilot control unit.

In an embodiment of the parking brake module, it has a first electronic control unit. The first electronic control unit is primarily used to activate the first pilot control unit, but can also be used to directly actuate the first parking brake valve unit, in the event that the first parking brake valve unit is electrically switchable and the first parking brake signal is an electric switching signal. In addition, the parking brake module preferably has a second electronic control unit for activating the second pilot control unit or for directly actuating the second parking brake valve unit. The first and second electronic control units are preferably integrated into the parking brake module, but can also be located externally to it. The first and second electronic control units are preferably supplied from different and independently provided power sources.

In an embodiment, the first parking brake signal or the second parking brake signal is a manual pneumatic pressure of a manual valve. Such a manual valve may be provided in or connected to the parking brake module. A manual valve is preferably provided as a manually operated slider valve. Such manual valves are provided in particular for trailer vehicles in order to manually specify the first and/or second parking brake signal, in particular from outside the trailer. In this way, manual ventilation and venting of the spring-loaded brake cylinders can be effected.

It can also be preferable that the parking brake module has a relay valve which is connected to the parking brake supply connection for receiving the supply pressure and which is connected to the parking brake valve assembly and which receives the parking brake working pressure from the parking brake valve assembly at a control connection and controls the parking brake pressure at the spring-loaded connection in response to the reception of the parking brake working pressure. Accordingly, the relay valve is preferably used to increase the volume of the parking brake working pressure and then to control it as a parking brake pressure with increased volume. This is especially preferable when one or more spring-loaded brake cylinders that require a larger volume are connected to the spring-loaded connection.

In such an arrangement, a holding valve is preferably also provided, which is arranged between the parking brake valve assembly and the relay valve, for locking the parking brake working pressure in or out.

According to a third aspect of the disclosure, the object mentioned above is achieved by a utility vehicle with an electronically controllable pneumatic braking system and a parking brake module according to one of the embodiments of a parking brake module described above according to the second aspect of the disclosure. It should be understood that the parking brake module according to the second aspect of the disclosure and the utility vehicle according to the third aspect of the disclosure have the same and similar sub-aspects. It may also be provided that the utility vehicle has an electronically controllable pneumatic braking system and a parking brake valve assembly in accordance with the first aspect of the disclosure, which will then preferably integrate the other devices or modules of the electronically controllable pneumatic braking system.

In a fourth aspect of the disclosure, the disclosure achieves the object mentioned at the beginning via a trailer with an electronically controllable pneumatic braking system and a parking brake module according to one of the embodiments of a parking brake module described above according to the second aspect of the disclosure, or by a parking brake valve assembly according to the first aspect of the disclosure. What has already been said in accordance with the third aspect of the disclosure applies to the trailer according to the fourth aspect of the disclosure.

BRIEF DESCRIPTION OF DRAWINGS

The invention will now be described with reference to the drawings wherein.

DETAILED DESCRIPTION

Figure 1:
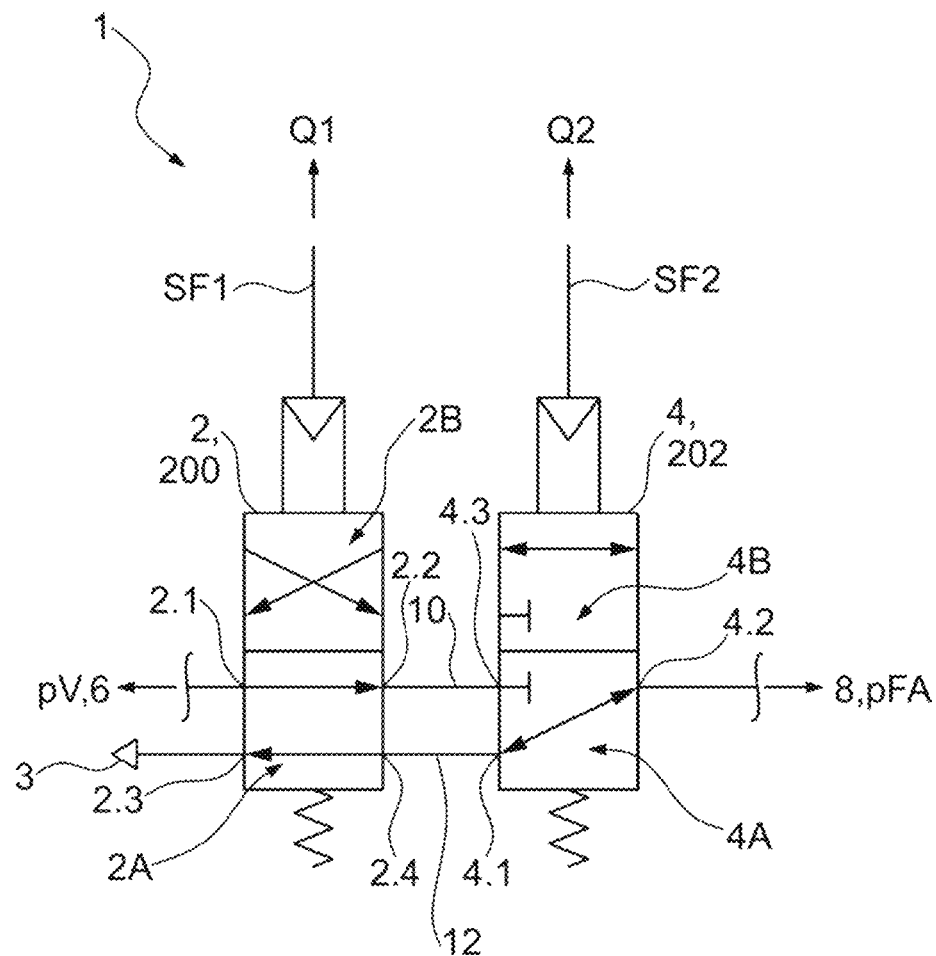
FIG. 1 shows a first embodiment of a parking brake valve assembly according to the first aspect of the disclosure.
Figure 2:
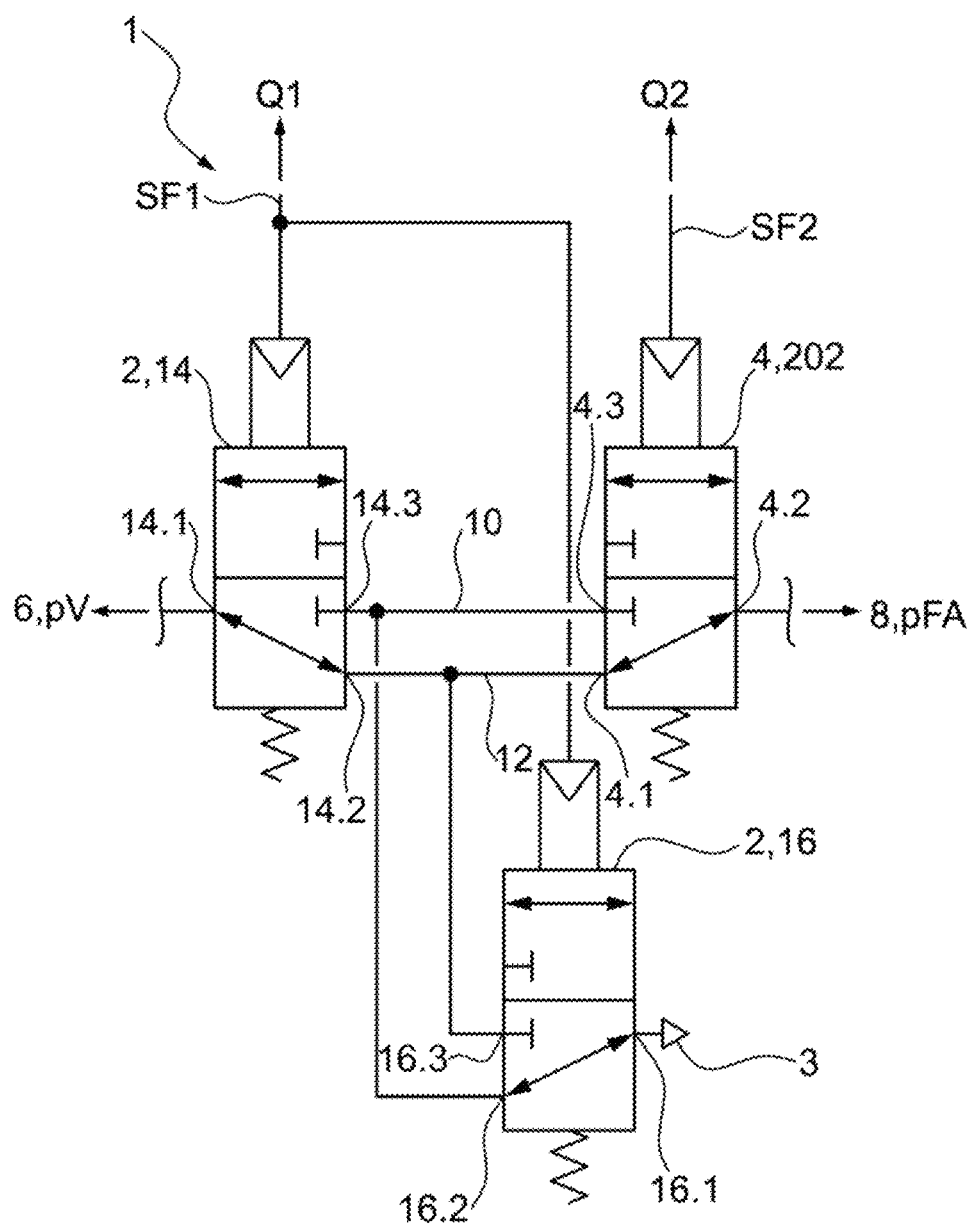
FIG. 2 shows a second embodiment of a parking brake valve assembly according to the first aspect of the disclosure.

First, FIGS. 1 and 2 are used to describe a parking brake valve assembly 1 in two different basic configurations. The parking brake valve assembly 1 contains a first parking brake valve unit 2 and a second parking brake valve unit 4. The first parking brake valve unit 2 and the second parking brake valve unit 4 are connected in series. The first parking brake valve unit 2 is connected to a parking brake supply connection 6, which is not specified here, and receives supply pressure pV from it. The second parking brake valve unit 4 is connected to a parking brake working connection 8, which is not specified here, and provides a parking brake working pressure pFA to it. The parking brake working pressure (pFA) can vary between the ambient pressure and a higher or high pressure suitable for releasing spring-loaded brake cylinders (not shown in FIGS. 1 and 2). The first and second parking brake valve units 2, 4 are connected in series between the parking brake supply connection 6 and the parking brake working connection 8. A first valve line 10 and a second valve line 12 run parallel to each other between the first and second parking brake valve units 2, 4.

Specifically, in the embodiment shown in FIG. 1, the first parking brake valve unit 2 is formed by a 4/2-way valve 200, which has a crossover circuit. In the embodiment shown here (FIG. 1), the first parking brake valve unit 2 has a first parking brake valve connection 2.1, a second parking brake valve connection 2.2, a third parking brake valve connection 2.3 and a fourth parking brake valve connection 2.4. The first parking brake valve unit 2 can be switched back and forth between a first switching position 2A and a second switching position 2B, but is spring-loaded and preloaded into the first switching position 2A. By controlling a first parking brake signal SF1 at the first parking brake valve unit 2, the first parking brake valve unit 2 is switched from the first switching position 2A, shown in FIG. 1, to the second switching position 2B, not shown in FIG. 2. The first parking brake signal SF1 can be both electric and pneumatic here, depending on the specific configuration of the first parking brake valve unit 2. In the first switching position 2A of the first parking brake valve unit 2, the first parking brake valve connection 2.1 is connected to the second parking brake valve connection 2.2 and the third parking brake valve connection 2.3 is connected to the fourth parking brake valve connection 2.4. In the second switching position 2B, the first parking brake valve connection 2.1 is connected to the fourth parking brake valve connection 2.4 and the second parking brake valve connection 2.2 is connected to the third parking brake valve connection 2.3. In the specific embodiment shown in FIG. 1, the first parking brake valve connection 2.1 is connected to the parking brake supply connection 6 and the third parking brake valve connection 2.3 is connected to a vent 3. The second parking brake valve connection 2.2 is connected to the first valve line 10 and the fourth parking brake valve connection 2.4 is connected to the second valve line 12. In the first switching position 2A (FIG. 1), the first valve line 10 is ventilated with the supply pressure pV, while the second valve line 12 is vented. If the first parking brake valve unit 2 is switched to the second switching position 2B, the connections are connected crosswise so that the second valve line 12 is then ventilated with supply pressure pV, while the first valve line 10 is vented.

In the embodiment shown in FIG. 1, the second parking brake valve unit 4 is a 3/2-way valve 202 and has a fifth parking brake valve connection 4.1, a sixth parking brake valve connection 4.2 and a seventh parking brake valve connection 4.3. The 3/2-way valve 202 that forms the second parking brake valve unit 4 is also spring-loaded in a first switching position 4A and can be switched to the second switching position 4B, which is not shown in FIG. 1, by providing a second parking break signal SF2, which can again be electric or pneumatic. In the first switching position 4A shown in FIG. 1, the fifth parking brake valve connection 4.1 is connected to the sixth parking brake valve connection 4.2, while in the second switching position 4B, the seventh parking brake valve connection 4.3 is connected to the sixth parking brake valve connection 4.2. In the switching position of the first and second parking brake valve units 2, 4 shown in FIG. 1, the sixth parking brake valve connection 4.2 is therefore connected to the vent 3, while the seventh parking brake valve connection 4.3 is closed. The sixth parking brake valve connection 4.2 is connected to the parking brake working connection 8 and controls the parking brake working pressure pFA. By switching the second parking brake valve unit 4 to the second switching position 4B, the parking brake working connection 8 can be ventilated in the embodiment shown here.

If, for example, the second parking brake valve unit 4 remains in the first switching position 4A, as shown in FIG. 1, and can no longer be switched by providing the second parking brake signal SF2, the parking brake working connection 8 can still be ventilated. For this purpose, it is then necessary to switch into the first parking brake valve unit 2, so that the pressure is exchanged between the first and second valve lines 10, 12 and the second valve line 12 is no longer connected to the vent 3 and the first valve line 10 is no longer ventilated with supply pressure pV, but vice versa. In this case, the second valve line 12 is then ventilated with supply pressure and the fifth parking brake valve connection 4.1 receives supply pressure, which is then transmitted to the sixth parking brake valve connection 4.2 in the first switching position 4A of the second parking brake valve unit 4 shown in FIG. 1 and is controlled there at the parking brake working connection 8. Regardless of the respective switching positions of the first and second parking brake valve units 2, 4, the parking brake working connection 8 can thus be ventilated and vented by switching one of the first and second parking brake valve units 2, 4.

FIG. 2 shows an alternative switching position to FIG. 1, in which the first parking brake valve unit 2 is not formed by a 4/2-way valve 200, but by a first switching valve 14 and a second switching valve 16, each of which is in the form of a 3/2-way valve. The first switching valve 14 has a first switching valve connection 14.1, a second switching valve connection 14.2 and a third switching valve connection 14.3. In a first switching position 2A of the first parking brake valve unit 2 shown in FIG. 2, the first switching valve connection 14.1 is connected to the second switching valve connection 14.2. In the second switching position 2B, not shown in FIG. 2, the first switching valve connection 14.1 is connected to the third switching valve connection 14.3. In the embodiment shown in FIG. 2, the first switching valve connection 14.1 is connected to the parking brake supply connection 6 and thus corresponds to the first parking brake valve connection 2.1. The second switching valve connection 14.2 is connected to the second valve line 12 and thus corresponds to the fourth parking brake valve connection 2.4. The third switching valve connection 14.3 is connected to the first valve line 10 and thus corresponds to the second parking brake valve connection 2.2. In order to change the ventilation and venting position of the first and second valve lines 10, 12, the second switching valve 16 is provided. The second switching valve 16 has a fourth switching valve connection 16.1, which is connected to the vent 3 and thus roughly corresponds in functionality to the third parking brake valve connection 2.3. The second switching valve 16 also has a fifth switching valve connection 16.2 connected to the first valve line 10 and a sixth switching valve connection 16.3 connected to the second valve line 12. The second switching valve 16 can optionally close or vent the fifth and sixth switching valve connections 16.2, 16.3 and thus maintain or vent the pressure in the first and second valve lines 10, 12 respectively. The first switching valve 14 may close either the second or third switching valve connection 14.2, 14.3 and thus maintain the pressure in the corresponding first or second valve line 10, 12 or apply supply pressure pV to the second or third switching valve connection 14.2, 14.3 and thus apply supply pressure to the first or second valve line 10, 12 in a corresponding manner. The connectivity of the first and second switching valves 14, 16 are chosen in such a way that, as long as the first parking brake signal SF1 is not provided and the first parking brake valve unit 2 is in the first switching position 2A shown in FIG. 2, the second valve line 12 is ventilated with supply pressure and the first valve line 10 is vented. If the first parking brake signal SF1 is provided, the switching position changes to the second switching position 2B, which is not shown in FIG. 2, in which the first valve line 10 is ventilated with supply pressure pV and the second valve line 12 is connected to the vent 3 and is thus vented.

In this way, the first and second parking brake valve units 2, 4 achieve a changeover circuit which, as shown in FIGS. 1 and 2, can be used both in the towing vehicle and in the trailer vehicle, in particular to ventilate and vent spring-loaded brake cylinders. According to the disclosure, it is also provided that the first and second parking brake signals SF1, SF2 are provided by independent sources, namely the first parking brake signal SF1 is provided by a first signal source Q1 and the second parking brake signal SF2 is provided by a second signal source Q2. These first and second signal sources Q1, Q2 can be electrical or pneumatic in nature.

The other FIGS. 3 to 9 now show specific embodiments of a parking brake module 100 in which the parking brake valve assembly 1 according to the present disclosure is used. In each case, only the parking brake valve assembly 1 according to the first embodiment shown in FIG. 1 is shown as an example, wherein in all embodiments of FIGS. 3 to 9 it should be understood that the parking brake valve assembly 1 can be of the same form as shown in FIG. 2, and that the 4/2-way valve 200 shown in FIGS. 3 to 9 can always be replaced by the first and second switching valves 14, 16 described with reference to FIGS. 1 and 2.

Figure 3:
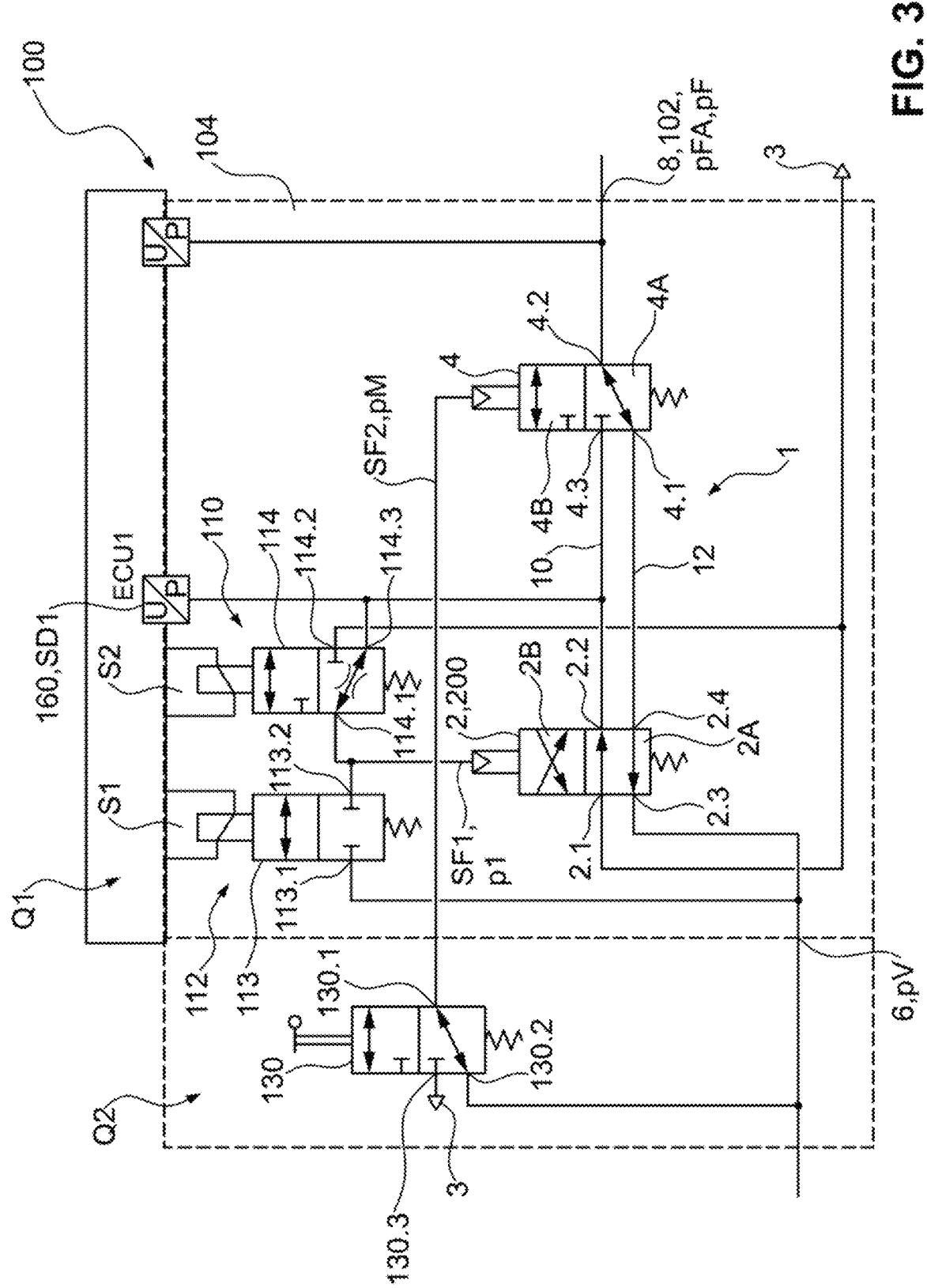
FIG. 3 shows a first embodiment of a parking brake module according to the second aspect of the disclosure.

FIG. 3 shows a parking brake module 100 that contains a first electronic control unit ECU1, which forms a first signal source Q1. The parking brake module 100 contains a spring-loaded connection 102 arranged in a housing 104 of the parking brake module 100. Here the spring-loaded connection 102 is formed by the parking brake working connection 8, and in this respect the parking brake valve assembly 1 is directly connected to the spring-loaded connection 102 and directly controls the parking brake working pressure pFA as the parking brake pressure pF there. In the embodiment shown in FIG. 3, the first electronic control unit ECU1 interacts with a first pilot control unit 110, which is basically formed like known pilot control units of known parking brake modules. The first pilot control unit 110 contains an inlet-outlet valve unit 112 with an inlet valve 113 and an outlet valve 114. The inlet valve 113 is in the form of a 2/2-way valve with a first inlet valve connection 113.1 and a second inlet valve connection 113.2, wherein the first inlet valve connection 113.1 is connected to the parking brake supply connection 6 and receives supply pressure pV. The second inlet valve connection 113.2 is connected to the first parking brake valve unit 2 and provides a first control pressure p1 to it, which embodies the first parking brake signal SF1 here. By providing a first switching signal S1 by the first electronic control unit ECU1, the inlet valve 113 can be moved to the second switching position not shown in FIG. 3, in which the first control pressure p1 is controlled. The inlet valve 113 is normally in a closed switching position. The outlet valve 114 is in the form of a 3/2-way valve and has a first outlet valve connection 114.1, a second outlet valve connection 114.2 and a third outlet valve connection 114.3. The first outlet valve connection 114.1 is connected to the first parking brake valve unit 2, the second outlet valve connection 114.2 is connected to the vent 3, and the third outlet valve connection 114.3 is connected to the first valve line 10. Likewise, the third outlet valve connection 114.3 could also be connected to the second valve line 12, depending on which of the first and second valve lines 10, 12 is to be ventilated with supply pressure in normal operation. In the deenergized switching position shown in FIG. 3, the first outlet valve connection 114.1 is connected to the third outlet valve connection 114.3 so that the pressure controlled in the first valve line 10 is returned as the first control pressure p1. In this way, the first parking brake valve unit 2 is to be self-maintaining. The pressure in the first valve line 10 controlled by this valve is fed back via the outlet valve 114. By providing the second switching signal S2, the outlet valve 114 can be moved to a vent position in which the first control pressure p1 can be vented via the vent 3.

In the embodiment shown in FIG. 3, the second parking brake valve unit 4 is connected to a manual valve 130, which can be in the form in particular of a slider valve. The manual valve 130 forms the second signal source Q2 here. The manual valve 130 is shown adjacent to the parking brake module 100, but can also be arranged away from it, especially on the outside of a trailer. The manual valve 130 has a first manual valve connection 130.1, a second manual valve connection 130.2 and a third manual valve connection 130.3. The first manual valve connection 130.1 is connected to the second parking brake valve unit 4 and provides a manual pressure pM to it, which embodies the second parking brake signal SF2 here. The second manual valve connection 130.2 is connected to the parking brake supply connection 6 and receives supply pressure pV. Likewise, the second manual valve connection 130.2 could also be connected to a supply pressure source but separately from the parking brake supply connection 6. The connection shown in FIG. 3 merely shows that both the parking brake supply connection 6 and the second manual valve connection 130.2 are supplied from the same compressed air supply. The third manual valve connection 130.3 is connected to a vent 3. By moving the manual valve 130 to the second switching position that is not shown in FIG. 3, the manually controlled pressure pM can therefore be vented, so that the second parking brake valve unit 4 falls into the first switching position 4A under spring load, which is shown in FIG. 3.

In the normal operating condition of the vehicle, in which a parking brake module 100 as shown in FIG. 3 is used, the first switching signal S1 should first be provided in order to bring the first parking brake valve unit 2 to the second switching position that is not shown in FIG. 3, so that the first valve line 10 is ventilated. The pressure controlled in the first valve line 10 is returned via the non-switched outlet valve 114 and is maintained as the first control pressure p1, so that the first parking brake valve unit 2 remains in the second switching position 2B. At the same time, the manual valve 130 is in the switching position shown in FIG. 3, so that the manual pressure pM is controlled, which switches the second parking brake valve unit 4 to the second switching position 4B that is not shown in FIG. 3, so that the supply pressure pV is turned on by the first valve line 10 and the parking brake pressure pF can be controlled. In this way, the spring-loaded brake cylinders connected to the spring-loaded connection 102 can be vented and released. Now, when the vehicle is parked, by providing the second switching signal S2, the outlet valve 114 can be moved to the second switching position that is not shown in FIG. 3, so that the first control pressure p1 is vented and the first parking brake valve unit 2 is switched to the first switching position 2A as shown in FIG. 3. The first valve line 10 is then depressurized. Accordingly, the spring-loaded brake connection 102 is also vented via the second parking brake valve unit 4, so that the spring-loaded brake cylinders that are connected to the spring-loaded brake connection 102 are vented and clamp. Now, by operating the manual valve 130, an operator can vent the manually controlled pressure pM so that the second parking brake valve unit 4 is also switched to the first switching position 4A shown in FIG. 3, so that both the first and the second parking brake valve units 2, 4 take up the switching positions shown in FIG. 3. It can be seen in this that the supply pressure pV is controlled in the second valve line 12 via the second and fourth parking brake valve connections 2.3, 2.4 and is controlled from this at the spring-loaded connection 102 via the fifth parking brake valve connection 4.1 and the sixth parking brake valve connection 4.2, so that the spring-loaded brake cylinders connected to the spring-loaded connection 102 can be ventilated and thus released.

Figure 4:
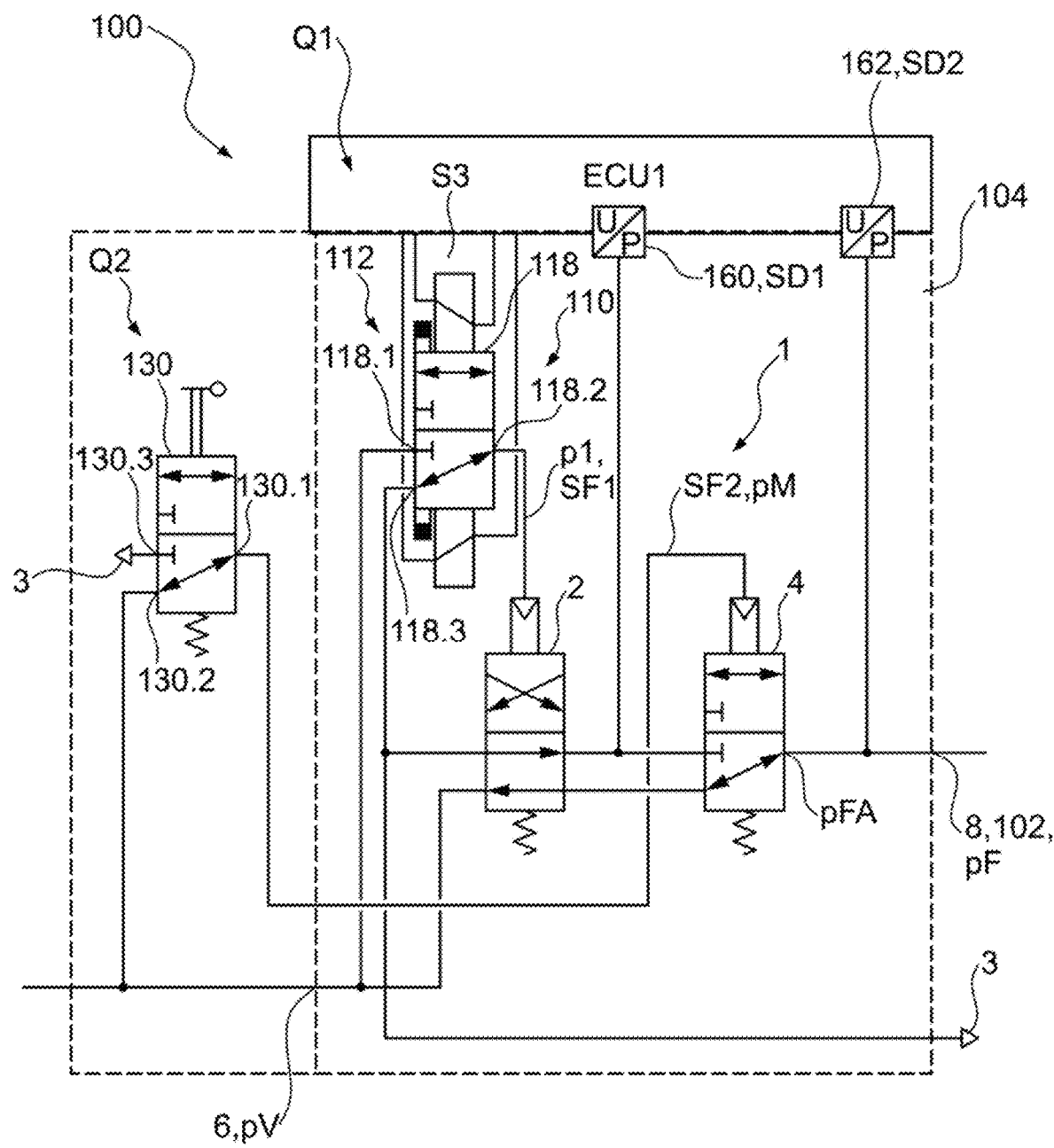
FIG. 4 shows a second embodiment of a parking brake module according to the second aspect of the disclosure.

The embodiment shown in FIG. 4 is based on the embodiment shown in FIG. 1, so that identical and similar elements are provided with the same reference signs and only the differences will be discussed below. In contrast to the embodiment according to FIG. 3, the inlet-outlet valve unit 112 is formed by a single bistable valve 118, which has two electromagnetic detent positions and thus provides electromagnetic bistability. The bistable valve 118 has a first bistable valve connection 118.1 that is connected to the parking brake supply connection 6 and that receives supply pressure pV, a second bistable valve connection 118.2 that is connected to the first parking brake valve unit 2 and that is capable of controlling the first control pressure p1 to embody the first parking brake signal SF1, and a third bistable valve connection 118.3 connected to the vent 3. By switching the bistable valve 118 based on a third switching signal provided by the first electronic control unit ECU1, the first control pressure p1 can either be provided or vented.

In the first embodiment according to FIG. 3, a first pressure sensor 160 is already shown, which provides a first pressure signal SD1 to the first electronic control unit ECU1. The first pressure signal SD1 represents the pressure applied in the first valve line 10. The first pressure signal SD1 can therefore be used to check the plausibility of the controlled parking brake pressure pF and also to verify the switching positions of the first and second parking brake valve units 2, 4. In addition to this first pressure sensor 160, the parking brake module 100 according to FIG. 4 also contains a second pressure sensor 162, which provides a second pressure signal SD2 to the first electronic control unit ECU1. The second pressure signal SD2 represents the pressure controlled at the parking brake working connection 8, in the embodiment shown here the parking brake working pressure pFA. This can also be used to check the plausibility and determine the switching positions of the valves.

The embodiment of the parking brake module 100 shown in FIG. 5 is again based on the previous embodiment, so that identical and similar elements are provided with the same reference signs and thus reference is made in full to the above description. The first parking brake valve unit 2 is formed in accordance with the embodiment shown in FIG. 3, as is the first pilot control unit 110, which provides the first control pressure p1 to the first parking brake valve unit 2.

Figure 5:
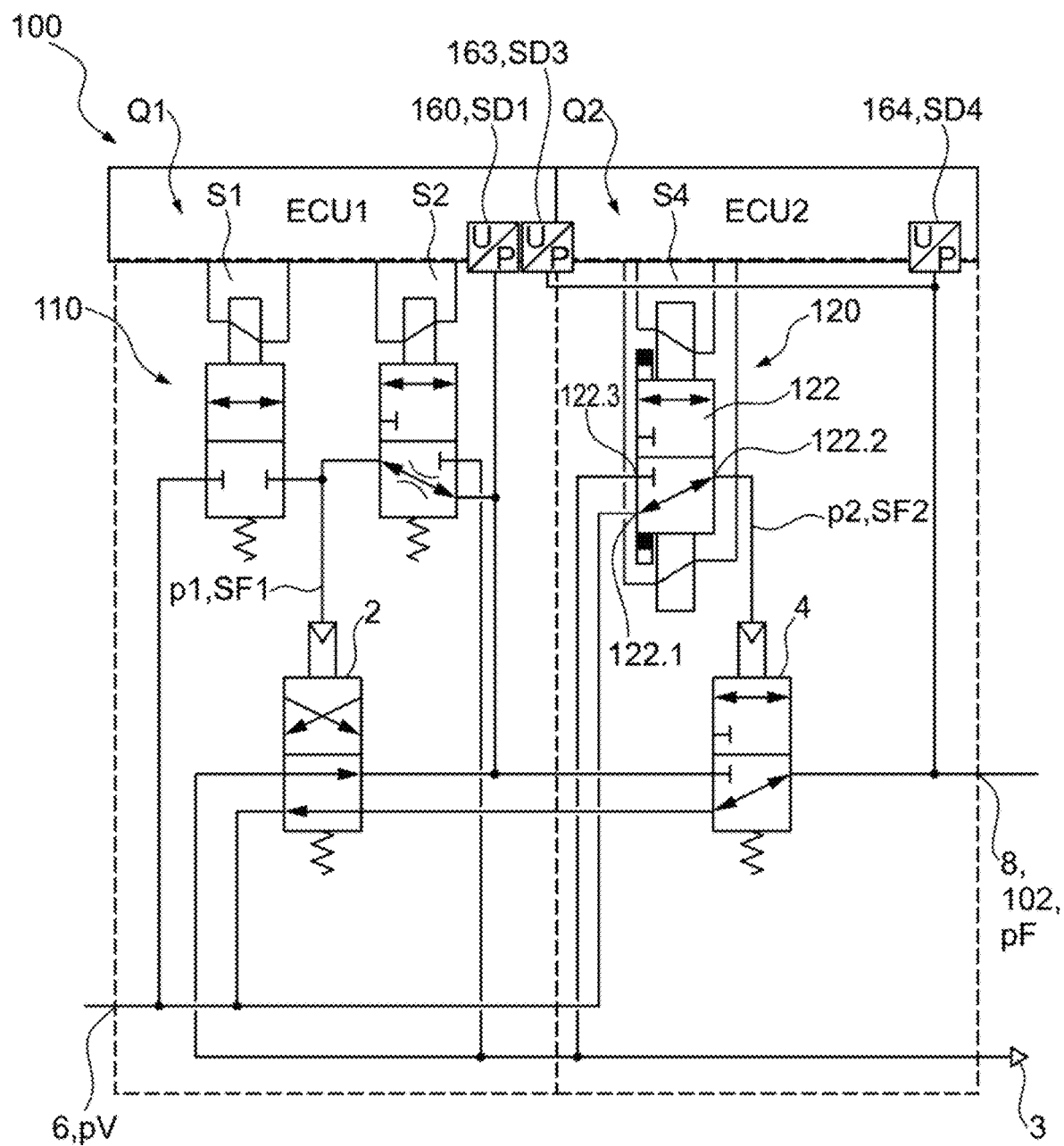
FIG. 5 shows a third embodiment of a parking brake module according to the second aspect of the disclosure.

In a deviation from the previous embodiments, however, the second parking brake valve unit 4 is not actuated by a manual pressure pM, but by a second control pressure p2, which embodies the second parking brake signal SF2 in the embodiment shown here (FIG. 5). To provide the second control pressure p2, a second pilot control unit 120 is provided. The second pilot control unit 120 is controlled by a second electronic control unit ECU2, here via a fourth switching signal S4. The second pilot control unit 120 is of bistable form here, that is, preferably electromagnetically bistable, and contains another bistable valve 122 with another first bistable valve connection 122.1, another second bistable valve connection 122.2 and another third bistable valve connection 122.3. The other first bistable valve connection 122.1 is connected to the parking brake supply connection 6 and receives supply pressure from it. The other second bistable valve connection 122.2 is connected to the second parking brake valve unit 4 and provides the second control pressure p2 to it. The other third bistable valve connection 122.3 is connected to the vent 3. By alternately switching the other bistable valve 122, the second control pressure p2 can thus be provided or vented.

In the embodiment shown in FIG. 5, a third and a fourth pressure sensor 163, 164 are also provided, both of which detect the pressure controlled at the parking brake working connection 8 and provide corresponding third and fourth pressure signals SD3, SD4 to the first electronic control unit ECU1 and the second electronic control unit ECU2 respectively.

Even though the parking brake module 100 is formed as a single unit here, it should be understood that the individual subgroups, containing in a first subgroup the first electronic control unit ECU1, the first pilot control unit 110 as well as the first parking brake valve unit 2 together with the first and third pressure sensors 160, 163, can form one unit and a second subgroup, containing the second electronic control unit ECU2, the second pilot control unit 120, the second parking brake valve unit 4 and the fourth pressure sensor 164, can form a separate second unit.

Figure 6:
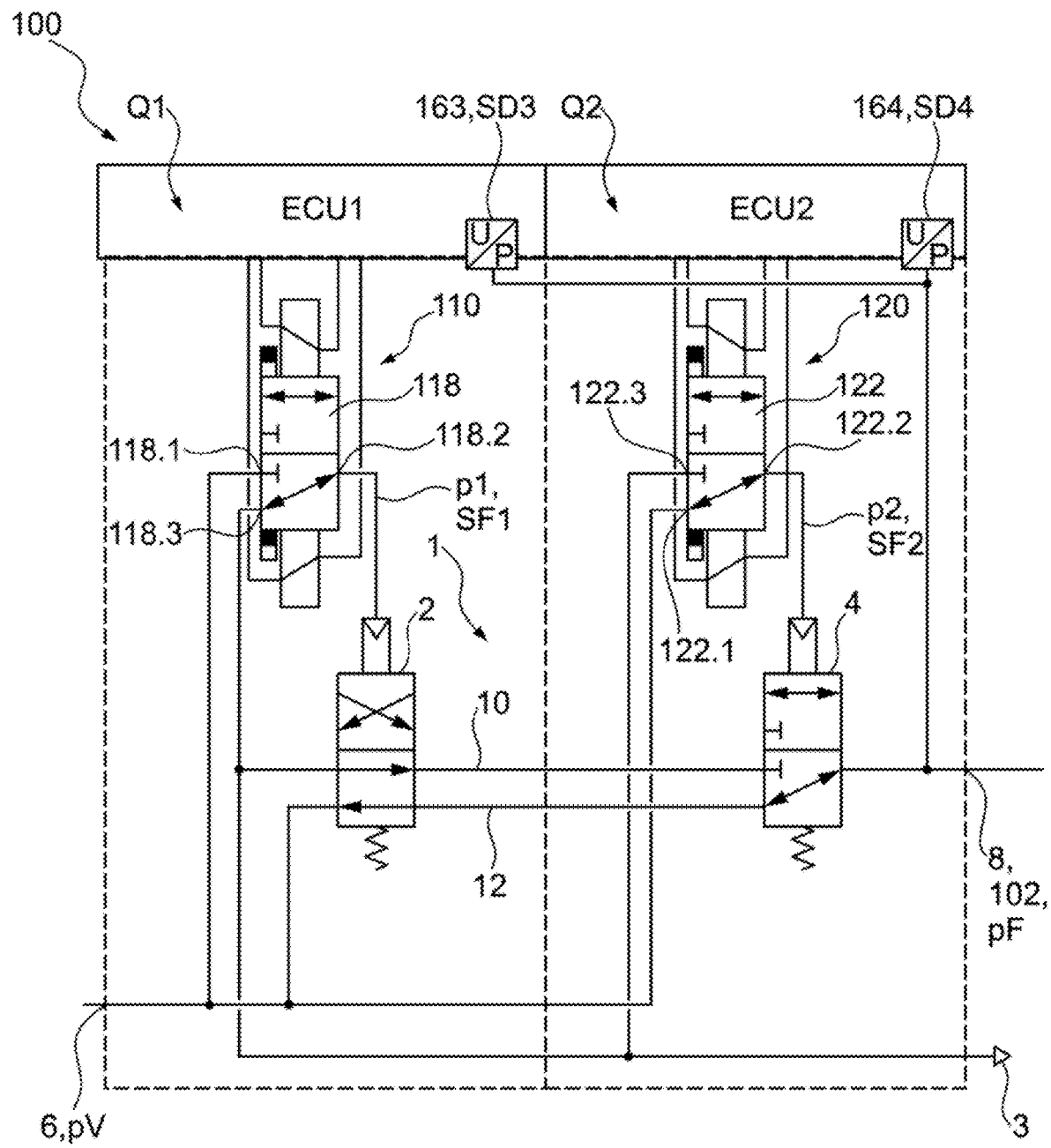
FIG. 6 shows a fourth embodiment of a parking brake module according to the second aspect of the disclosure.
Figure 7:
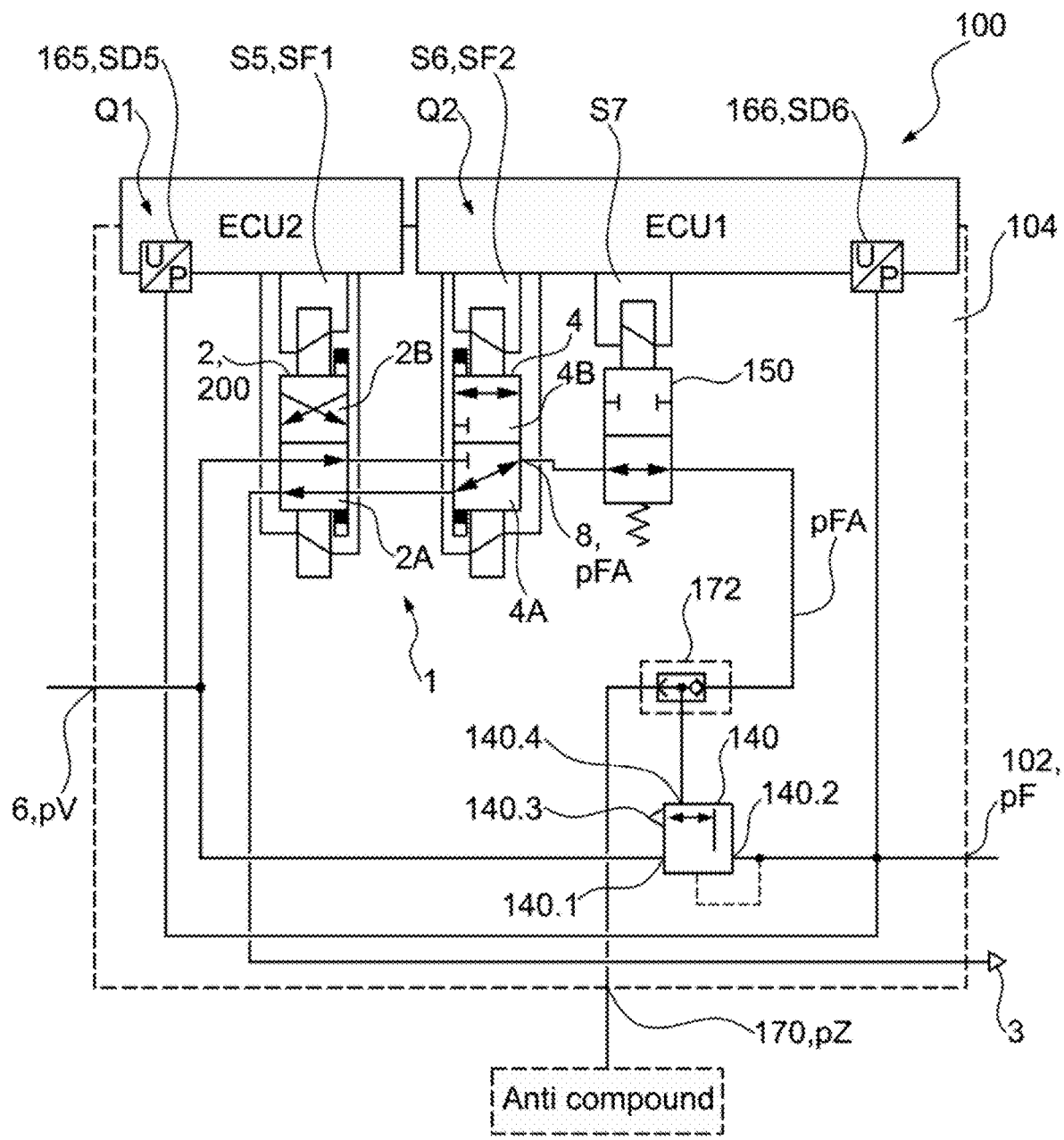
FIG. 7 shows a fifth embodiment of a parking brake module according to the second aspect of the disclosure.
Figure 8:
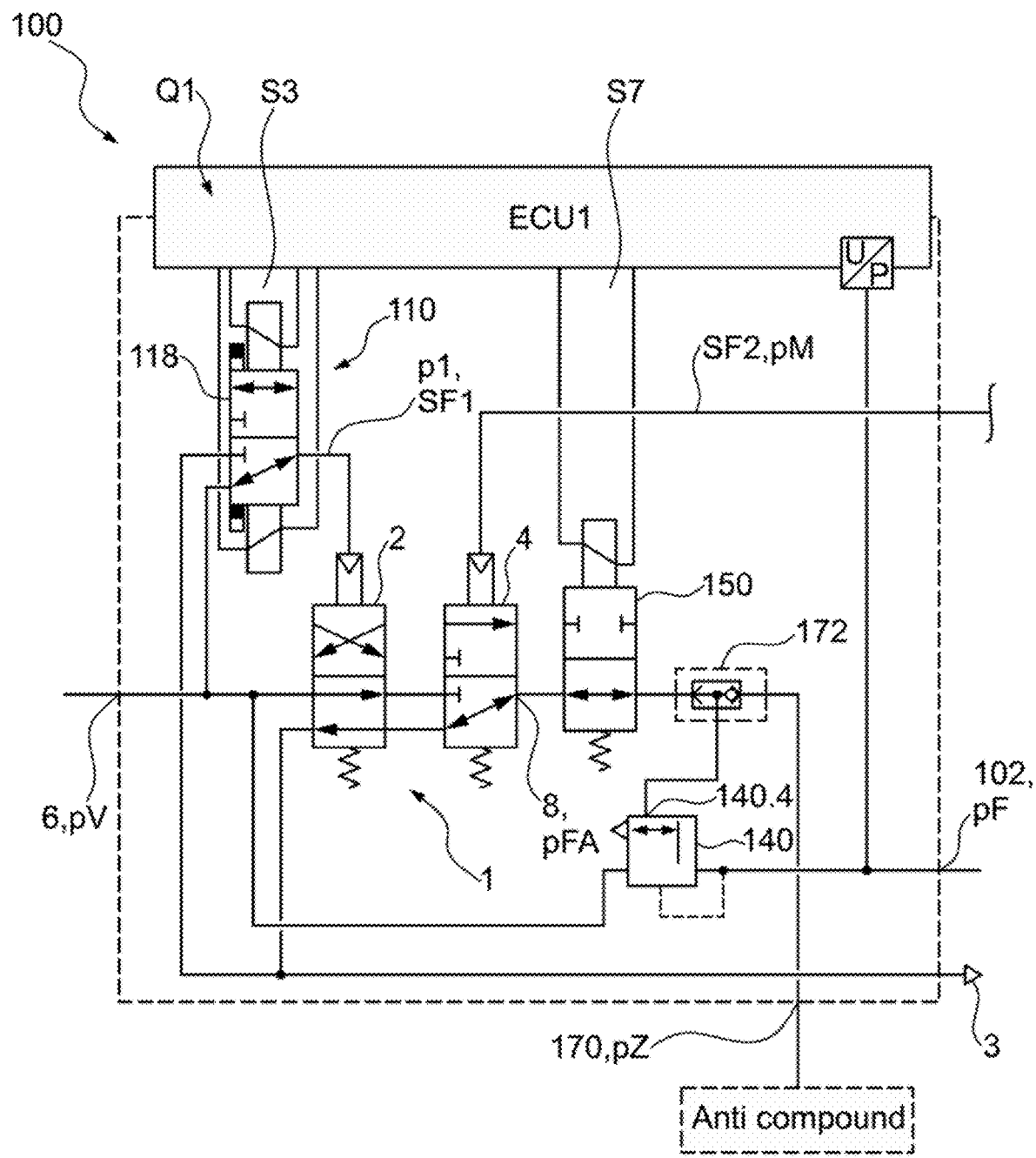
FIG. 8 shows a sixth embodiment of a parking brake module according to the second aspect of the disclosure; and, FIG. 9 shows a seventh embodiment of a parking brake module according to the second aspect of the disclosure.
Figure 9:
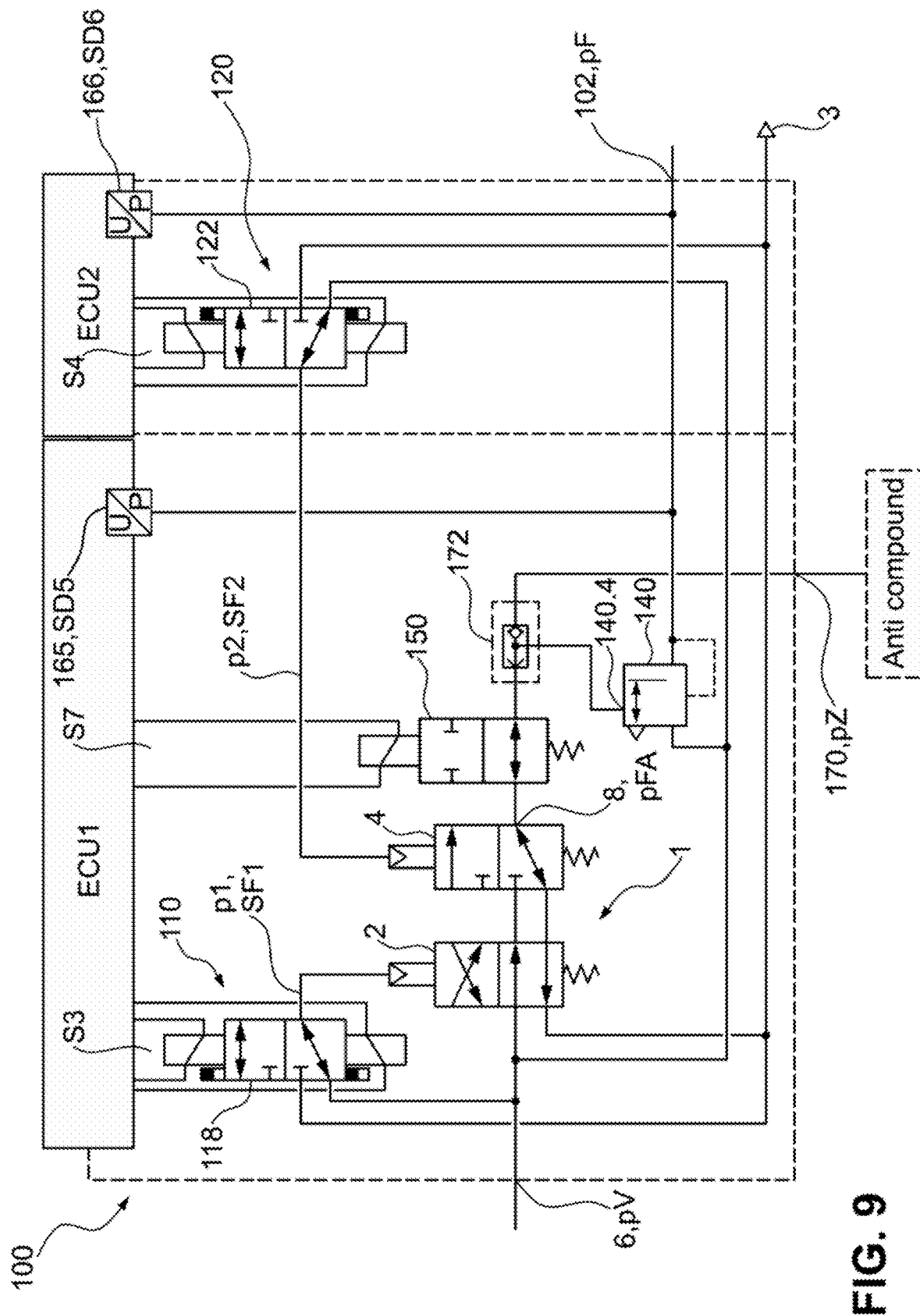

The embodiment shown in FIG. 6 is based on the embodiment shown in FIG. 4 and FIG. 5, wherein identical and similar elements are provided with the same reference signs, so that full reference is made to the above description. In the embodiment shown in FIG. 6, the first pilot control unit 110, which is formed with the bistable valve 118 here according to FIG. 4, is provided for the first parking brake valve unit 2 and the second pilot control valve unit 120, which is provided with the additional bistable valve 122 according to FIG. 5, is provided for the second parking brake valve unit 4. The embodiments according to FIGS. 3 to 6 have in common that the second parking brake valve unit 4 is directly connected to the spring-loaded connection 102 and thus the parking brake working connection 8 forms the spring-loaded connection 102 or is directly connected to it. In the embodiments of FIGS. 7 to 9 that are to be described now, a relay valve 140 is provided, which is connected between the parking brake working connection 8 and the spring-loaded connection 102, and thus increases the volume of the parking brake working pressure pFA and then controls it as the parking brake pressure pF.

The parking brake module 100 shown in FIG. 7 contains as an additional special feature the parking brake valve assembly 1 already known from FIG. 1, wherein, however, the 4/2-way valve 200, which forms the first parking brake valve unit 2, is of bistable form and thus, by providing a fifth switching signal, which can be provided by the second electronic control unit ECU2, can be switched back and forth between the first and second switching positions 2A, 2B in an electromagnetically bistable manner. The fifth switching signal S5 therefore forms the first parking brake signal SF1 here. Similarly, the 3/2-way valve, which forms the second parking brake valve unit 4, is also bistable, also electromagnetically bistable, and can be switched back and forth between the first and second switching positions 4A, 4B via a sixth switching signal S6, so that the sixth switching signal provided by the first electronic control unit ECU1 embodies the second parking brake signal SF2. The first and second parking brake signals SF1, SF2 are therefore electrical in the embodiment shown here (FIG. 7). The relay valve 140 is of a form according to the usual relay valves and has a relay valve supply connection 140.1 that is connected to the parking brake supply connection 6 and that receives the supply pressure pV, a relay valve working connection 140.2 that is connected to the spring-loaded connection 102 and that controls the parking brake pressure pF, a relay valve vent connection 140.3 that is connected to a vent and a relay valve control connection 140.4 that receives the parking brake working pressure pFA.

As a further difference from the previous embodiments, a holding valve 150 is provided, which is arranged between the parking brake valve assembly 1 and the relay valve 140, for locking in or locking out the parking brake working pressure pFA. Once the parking brake working pressure pFA has been controlled, the holding valve 150 can be moved to the switching position that is not shown in FIG. 7 by providing a seventh switching signal S7, so that the holding valve 150 is then in the closed switching position that is not shown in FIG. 7 and the parking brake working pressure pFA is locked in at the relay valve control connection 140.4. As a result, the parking brake pressure pF is controlled independently of the switching positions of the first and second parking brake valve units 2, 4.

As a further special feature, the parking brake module 100 in the embodiment shown here contains an anti-compound connection 170, as is basically known in the prior art. A release pressure pZ can be controlled at the anti-compound connection 170, especially manually. In order to control either the release pressure pZ or the parking brake working pressure pFA at the relay valve control connection 140.4, a change-over valve is also provided, which is in the form of a select-high valve in order to control the higher of the release pressure pZ and the parking brake working pressure pFA at the relay valve control connection 140.4.

In addition, a fifth and sixth pressure sensor 165, 166 are provided, wherein the fifth pressure sensor provides a fifth pressure signal SD5 to the second electronic control unit ECU2 and the sixth pressure sensor 166 provides a sixth pressure signal SD6 to the first electronic control unit ECU1, each representing the parking brake pressure pF.

The embodiment shown in FIG. 8 is a mixture of the embodiment according to FIG. 7 and FIG. 4. The parking brake valve assembly 1 initially corresponds to that according to FIG. 4, wherein the first pilot control unit 110 with the bistable valve 118, which is controlled by the first electronic control unit ECU1 via the third switching signal S3, is also provided for the first parking brake valve unit 2. The second parking brake valve unit 4 is again actuated by a manual pressure pM, which can be provided, for example, by a manual valve 130 or by another unit. Downstream of the parking brake valve assembly 1, however, are the holding valve 150, the changeover valve 172 and the relay valve 140, as described with reference to FIG. 7. Identical and similar elements are provided with the same reference signs, so that the above description is referred to in full.

The embodiment shown in FIG. 9 is essentially based on the embodiment shown in FIG. 8, wherein the second parking brake signal SF2 is not formed by the manual pressure pM, but by the second control pressure p2, as known from FIG. 5. Likewise, as known from FIG. 5, the second control pressure p2 is provided by the additional bistable valve 122, which is part of the second pilot control unit 120 and is actuated by the second electronic control unit ECU2 via the fourth switching signal S4. Identical and similar elements are again provided with the same reference signs, so that full reference is made to the above description.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION

1 Parking brake valve assembly
2 First parking brake valve unit
2.1 First parking brake valve connection
2.2 Second parking brake valve connection
2.3 Third parking brake valve connection
2.4 Fourth parking brake valve connection
2A First switching position
2B Second switching position
3 Vent
4 Second parking brake valve unit
4.1 Fifth parking brake valve connection
4.2 Sixth parking brake valve connection
4.3 Seventh parking brake valve connection
4A First switching position
4B Second switching position
6 Parking brake supply connection
8 Parking brake working connection
10 First valve line
12 Second valve line
14 First switching valve
14.1 First switching valve connection
14.2 Second switching valve connection
14.3 Third switching valve connection
16 Second switching valve
16.1 Fourth switching valve connection
16.2 Fifth switching valve connection
16.3 Sixth switching valve connection
100 Parking brake module
102 Spring-loaded connection
104 Housing
110 First pilot control unit
112 Inlet-outlet valve unit
113 Inlet valve
113.1 First inlet valve connection
113.2 Second inlet valve connection 114 Outlet valve
114.1 First outlet valve connection
114.2 Second outlet valve connection
114.3 Third outlet valve connection
118 Bistable valve
118.1 First bistable valve connection
118.2 Second bistable valve connection
118.3 Third bistable valve connection
120 Second pilot control unit
122 Additional bistable valve
122.1 Additional first bistable valve connection
122.2 Additional second bistable valve connection
122.3 Additional third bistable valve connection
130 Manual valve
130.1 First manual valve connection
130.2 Second manual valve connection
130.3 Third manual valve connection
140 Relay valve
140.1 Relay valve supply connection
140.2 Relay valve working connection
140.3 Relay valve vent connection
140.4 Relay valve control connection
160 First pressure sensor
162-166 Second to sixth pressure sensors
170 Anti-compound connection
172 Changeover valve
200 4/2-way valve
202 3/2-way valve
ECU1 First electronic control unit
ECU2 Second electronic control unit
p1 First control pressure
p2 Second control pressure
pf Parking brake pressure
pFA Parking brake working pressure
pM Manual pressure
pV Supply pressure
Q1 First signal source
Q2 Second signal source
S1-S7 First to seventh switching signals
SD1-SD6 First to sixth pressure signals
SF1 First parking brake signal
SF2 Second parking brake signal

The invention claimed is:

1. A parking brake valve assembly for a pneumatic braking system of a utility vehicle, the parking brake valve assembly comprising:
a first parking brake valve unit;
a second parking brake valve unit;
said first parking brake valve unit defining a plurality of switching positions including a first switching position (2A) to a second switching position (2B);
said first parking brake valve unit being configured to be actuated by a first parking brake signal and to be switched from said first switching position (2A) to said second switching position (2B);
said second parking brake valve unit defining a plurality of switching positions including a first switching position (4A) to a second switching position (4B);
said second parking brake valve unit being configured to be actuated by a second parking brake signal and to be switched from said first switching position (4A) to said second switching position (4B);
the first parking brake signal and the second parking brake signal being independent of each other; and,
said first parking brake valve unit and said second parking brake valve unit being pneumatically connected in series between a parking brake supply connection and a parking brake working connection such that said parking brake working connection is configured to be both ventilated and vented independently of the switching position of one of said first parking brake valve unit and said second parking brake valve unit by switching another of said first parking brake valve unit and said second parking brake valve unit.

2. The parking brake valve assembly of claim 1, wherein said first parking brake valve unit is connected to the parking brake supply connection and is configured to receive supply pressure from the parking brake supply connection.

3. The parking brake valve assembly of claim 1, wherein said second parking brake valve unit is connected to the parking brake working connection and is configured to control a parking brake working pressure at said parking brake working connection.

4. The parking brake valve assembly of claim 1, wherein said first parking brake signal is provided by a first signal source and the second parking brake signal by a second signal source; and, the first signal source and the second signal source are independent of each other.

5. The parking brake valve assembly of claim 4, wherein the first signal source and the second signal source are supplied from two independent voltage sources.

6. The parking brake valve assembly of claim 1, wherein said first parking brake valve unit and said second parking brake valve unit are connected to each other via a first valve line and a separate second valve line for a realization of a changeover switching function.

7. The parking brake valve assembly of claim 6, wherein, via said first parking brake valve unit, either said first valve line or said separate second valve line is configured to be ventilated with supply pressure and vented.

8. The parking brake valve assembly of claim 6, wherein, via said second parking brake valve unit, either said first valve line or said separate second valve line is configured to be connected to said parking brake working connection.

9. The parking brake valve assembly of claim 1, wherein:
said first parking brake valve unit is a 4/2-way valve with a first parking brake valve connection, a second parking brake valve connection, a third parking brake valve connection, and a fourth parking brake valve connection;
in said first switching position (2A), said first parking brake valve connection is connected to said second parking brake valve connection and said third parking brake valve connection is connected to said fourth parking brake valve connection; and,
in said second switching position (2B), said first parking brake valve connection is connected to said fourth parking brake valve connection and said third parking brake valve connection is connected to said second parking brake valve connection.

10. The parking brake valve assembly of claim 1, wherein said first parking brake valve unit includes a first switching valve and a second switching valve; said first switching valve and said second switching valve are each a 3/2-way valve; and, both said first switching valve and said second switching valve are configured to be actuated by said first parking brake signal.

11. The parking brake valve assembly of claim 1, wherein said second parking brake valve unit is a 3/2-way valve with a fifth parking brake valve connection, a sixth parking brake valve connection, and a seventh parking brake valve connection; and, in said first switching position (4A), said fifth parking brake valve connection is connected to said sixth parking brake valve connection, and in said second switching position (4B), said seventh parking brake valve connection is connected to said sixth parking brake valve connection.

12. The parking brake valve assembly of claim 1, wherein at least one of the first parking brake signal and the second parking brake signal is pneumatic or electric.

13. The parking brake valve assembly of claim 1, wherein at least one of said first parking brake valve unit and said second parking brake valve unit is of bistable form.

14. A parking brake module for a pneumatic braking system of a utility vehicle, the parking brake module comprising:
- a parking brake supply connection for receiving supply pressure;
- a spring-loaded connection for providing a parking brake pressure; and,
- a parking brake valve assembly having a first parking brake valve unit and a second parking brake valve unit;
- said first parking brake valve unit defining a plurality of switching positions including a first switching position (2A) to a second switching position (2B);
- said first parking brake valve unit being configured to be actuated by a first parking brake signal and to be switched from said first switching position (2A) to said second switching position (2B);
- said second parking brake valve unit defining a plurality of switching positions including a first switching position (4A) to a second switching position (4B);
- said second parking brake valve unit being configured to be actuated by a second parking brake signal and to be switched from said first switching position (4A) to said second switching position (4B);
- the first parking brake signal and the second parking brake signal being independent of each other; and,
- said first parking brake valve unit and said second parking brake valve unit being pneumatically connected in series between said parking brake supply connection and a parking brake working connection such that said parking brake working connection is configured to be both ventilated and vented independently of the switching position of one of said first parking brake valve unit and said second parking brake valve unit by switching another of said first parking brake valve unit and said second parking brake valve unit.

15. The parking brake module of claim 14 further comprising:
- a first pilot control unit connected to said parking brake supply connection and configured to receive the supply pressure from said parking brake supply connection; and,
- said first pilot control unit being switchable in order to control a first control pressure, wherein said first control pressure is controlled as the first parking brake signal to at least said first parking brake valve unit for switching said first parking brake valve unit.

16. The parking brake module of claim 15, further comprising:
- a second pilot control unit connected to said parking brake supply connection and configured to receive the supply pressure from said parking brake supply connection; and,
- said second pilot control unit being switchable to control a second control pressure, wherein said second control pressure is controlled as the second parking brake signal to at least said second parking brake valve unit for switching said second parking brake valve unit.

17. The parking brake module of claim 15 further comprising a first electronic control unit for actuating the first pilot control unit.

18. The parking brake module of claim 16 further comprising a second electronic control unit for actuating said second pilot control unit.

19. The parking brake module of claim 14, wherein the first parking brake signal or the second parking brake signal is a manual pneumatic pressure of a manual valve.

20. The parking brake module of claim 14 further comprising:
- a relay valve connected to said parking brake supply connection for receiving the supply pressure and connected to said parking brake valve assembly and configured to receive the parking brake working pressure from said parking brake valve assembly at a control connection and, in response to receiving the parking brake working pressure, to control the parking brake pressure at said spring-loaded connection.

21. The parking brake module of claim 20 further comprising:
- a holding valve arranged between said parking brake valve assembly and said relay valve for locking in or locking out the parking brake working pressure.

22. A utility vehicle comprising:
- an electronically controllable pneumatic braking system; and,
- the parking brake module of claim 14.

23. A trailer comprising:
- an electronically controllable trailer braking system; and,
- the parking brake module of claim 14.

* * * * *